United States Patent
Han

(10) Patent No.: US 10,963,329 B2
(45) Date of Patent: Mar. 30, 2021

(54) UNIVERSAL REGISTER READ BACK

(71) Applicant: OmniVision Technologies, Inc., Santa Clara, CA (US)

(72) Inventor: Dapeng Han, Oslo (NO)

(73) Assignee: OmniVision Technologies, Inc., Santa Clara, CA (US)

(*) Notice: Subject to any disclaimer, the term of this patent is extended or adjusted under 35 U.S.C. 154(b) by 210 days.

(21) Appl. No.: 16/162,690

(22) Filed: Oct. 17, 2018

(65) Prior Publication Data
US 2020/0125439 A1    Apr. 23, 2020

(51) Int. Cl.
| | |
|---|---|
| *G06F 11/00* | (2006.01) |
| *G06F 11/07* | (2006.01) |
| *G06F 9/30* | (2018.01) |

(52) U.S. Cl.
CPC ...... *G06F 11/0772* (2013.01); *G06F 9/30101* (2013.01); *G06F 11/076* (2013.01)

(58) Field of Classification Search
CPC ............... G06F 11/0772; G06F 11/076; G06F 11/1608; G06F 11/1612; G06F 11/1666; G06F 11/167
See application file for complete search history.

(56) References Cited

U.S. PATENT DOCUMENTS

| | | | | |
|---|---|---|---|---|
| 2013/0061094 A1* | 3/2013 | Busch | ............... | G06F 11/2215 714/27 |
| 2013/0275817 A1* | 10/2013 | Bancel | ............... | G11C 7/24 714/54 |
| 2019/0369884 A1* | 12/2019 | Miura | ............... | G06F 3/0619 |

* cited by examiner

*Primary Examiner* — Philip Guyton
(74) *Attorney, Agent, or Firm* — Christensen O'Connor Johnson Kindness PLLC

(57) ABSTRACT

A checking module is coupled to one or more registers to verify data written to the one or more registers. The checking module includes a memory coupled to an arbiter to receive data and an address (corresponding to the data) from the arbiter. The data is written to the one or more registers at the address. Comparator logic is coupled to the memory and to the one or more registers to compare the data written to the one or more registers and the data in the memory. An error flag circuit is coupled to the comparator logic, and in response to a difference between the data in the memory and the data written to the one or more registers, the error flag circuit outputs an error signal.

14 Claims, 4 Drawing Sheets

UNIVERSAL REGISTER READ BACK

TECHNICAL FIELD

This disclosure relates generally to electronic devices, and in particular but not exclusively, relates to checking registry entries.

BACKGROUND INFORMATION

Automotive Safety Integrity Level (ASIL) is a risk classification scheme that details functional safety for vehicles. The ASIL standard performs risk analysis of potential hazards by examining the exposure, severity, and controllability of vehicle operation. The standard identifies four ASILs: ASIL A, ASIL B, ASIL C, and ASIL D. ASIL A dictates the lowest integrity requirements for an electronic product, while ASIL D dictates the highest integrity requirements for a product.

For automotive image sensors, the correct writing to registers shall be checked. This is to make sure that data sent to registers is properly recorded and indexed.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1A:
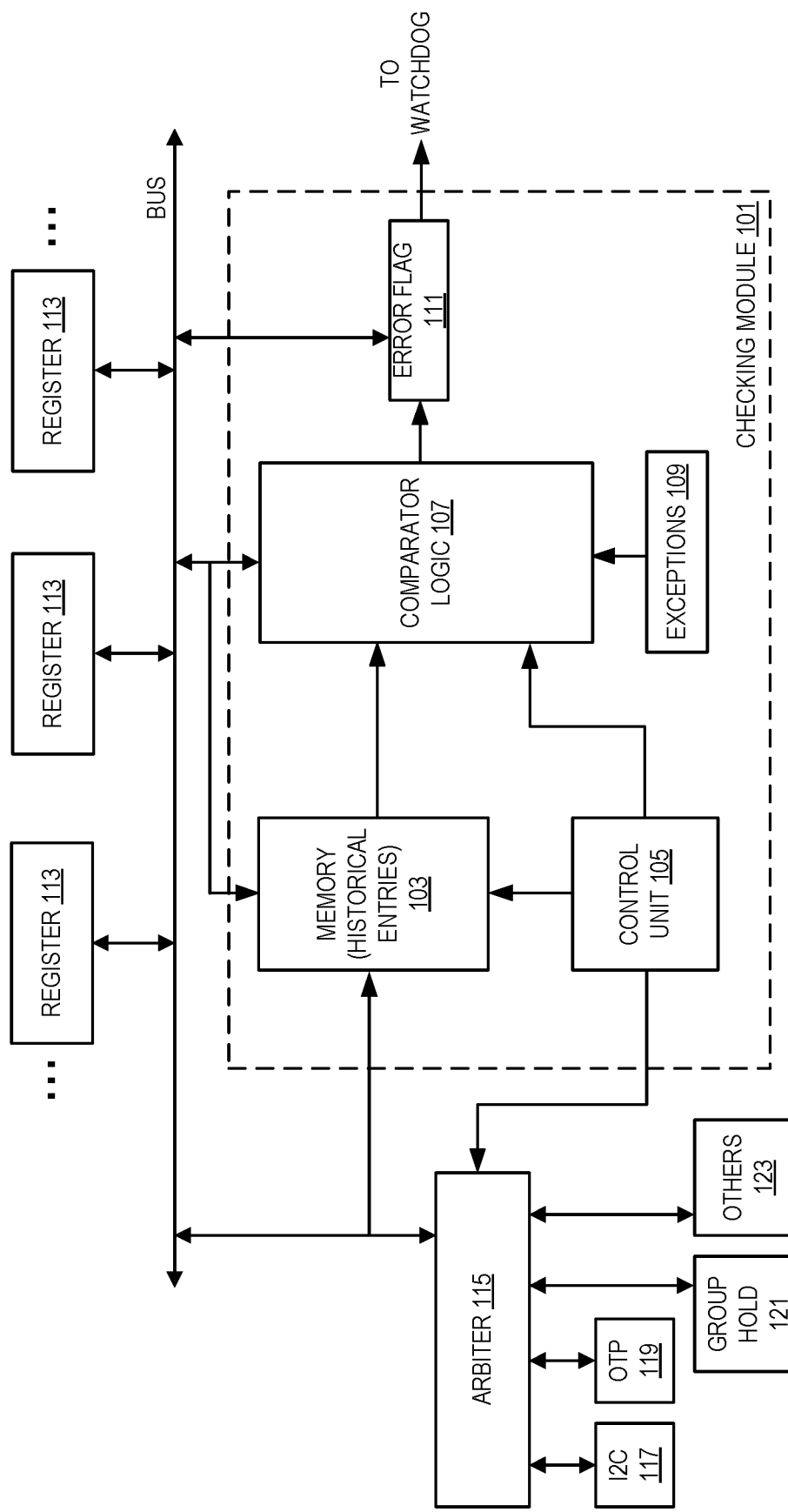
FIG. 1A illustrates a block diagram of a checking module coupled to one or more registers to verify data written to the one or more registers, in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for universal register read back are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

As stated, for automotive image sensors, data written to registers will be checked (e.g., a write, read back, and check mechanism). Presented herein is a novel register checking technique. The purpose of the register read back checking module disclosed herein is to continuously check that the data written to the register is correct, no matter which master on the bus system the register is writing from. Inside the checking module, there are a configurable number of entries recording register write access from an arbiter, including both the register address and the data itself. If any address is written again, it will overwrite the record. If the recording entries are full, or the configurable timeout counter reaches a maximum count, the checking module will start to read back register values. Inside the checking module, there is a last data entry, storing the last read back register data. The checking module will start reading back the register whose data is most different from last read back data, to avoid the case where the data bus is undriven but wire capacitance briefly maintains the bus state (which is a possible error case and may not be detected if the above technique is not applied).

While the checking module is reading back data, a control unit sends a signal to the arbiter, to prevent other masters from accessing the bus at the same time. Data in corresponding register is read back and compared with the data stored in the recording entries.

If the data read back and the data in recorded entries do not match, the system sends an error flag, which goes to a watchdog circuit. However, the system takes exceptions into consideration, for example, some registers may have auto reset bits. The exception block provides a bit mask to the comparator in these cases. After reading back all the stored entries, the control unit may notify the arbiter and release the bus for other masters on the bus.

The following disclosure will further describe the embodiments discussed above, and other embodiments, as they relate to the figures.

FIG. 1A illustrates a block diagram of checking module 101 coupled to one or more registers 113 to verify data written to one or more registers 113, in accordance with the teachings of the present invention. Checking module 101 includes memory (which includes historical registry entries) 103, control unit 105, comparator logic 107, exceptions logic 109, and error flag circuit 111. Also depicted is arbiter 115, inter-integrated circuit (I$^2$C) 117 (e.g., a synchronous, multi-master, multi-slave, packet switched, single-ended, serial computer bus), one time programmable non-volatile memory (OTP) 119, group hold 121 (e.g., an image sensor function that records register values in an internal buffer instead of writing to the registers directly; a register write burst can be triggered automatically or by an I$^2$C write and the specified group's register settings will be written to the registers), and others 123 (e.g., central processing unit, MIPI bus, serial peripheral interface, or the like). As shown I$^2$C 117, OTP 119, group hold 121, and others 123 are coupled to arbiter 115 to supply data to arbiter 115.

As shown, checking module 101 is coupled to one or more registers 113 to verify data (e.g., image data including images from an automotive image sensor, turn on procedures, or the like) written to one or more registers 113. Memory 103, comparator logic 107, and arbiter 115 are coupled to a bus, and the bus is coupled to one or more registers 113. Memory 103 is coupled to arbiter 115 to receive data and an address, corresponding to the data, from arbiter 115. The data is also written to one or more registers 113 at the address. Thus, memory 103 stores historical entries of both the data, and the address of the data, sent to one or more registers 113. Comparator logic 107 (e.g., including XOR gates or the like coupled to receive the data from one or more registers 113 and memory 103) is coupled to memory 103 and to one or more registers 113 to compare the data written to one or more registers 113 to the data in memory 103. In ideal conditions, the data in memory 103 and the data in registers 113 should be identical. However, error flag circuit 111 is coupled to comparator logic 107, and in response to a difference between the data in memory 103 and the data written to one or more registers 113, error flag circuit 111 outputs an error signal. Thus, when the data in both memory 103 and registers 113 is not the same, comparator 107 will instruct error flag circuit 111 to output an error signal. The error signal is sent to a watchdog circuit, which may cause other processes to initiate protocols that protect the system from corrupt data.

As illustrated, control unit 105 is coupled to memory 103 and arbiter 115, and memory 103 accepts data from arbiter 115 until a timer in control unit 105 reaches a maximum count (or until the memory entries are full). In response to the timer reaching the maximum count (or the entries being full), comparator logic 107 compares the data written to one or more registers 113 and the data in memory 103. In some examples, the data is no longer received by memory 103 and one or more registers 113 from arbiter 115 when the timer reaches the maximum count. This is because control unit 105 may send a block signal to arbiter 115 to block access to the bus when the timer reaches the maximum count. Put another way, in some examples, the data in memory 103 and registers 113 may not be compared until memory 103 has acquired a sufficient number of entries. Then all of the entries stored on memory 103 will be compared to the entries stored in registers 113. While this comparison is occurring, no new entries will be sent to the registers 113 and memory 103. Similarly, in some examples, comparator logic 107 is coupled to memory 103 and to one or more registers 113 to compare the address in memory 103 and the address in one or more registers 113. This may occur at the same time as comparing the data in memory 103 and registers 113. In some examples, just like how the error flag circuit 111 outputs an error signal for discrepancies in data, in response to a difference between the address in memory 103 and the address in one or more registers 113, error flag circuit 111 outputs an error signal.

In the illustrated example, exceptions logic 109 is coupled to the comparator logic 107, and exceptions logic 109 provides a bit mask to comparator logic 107 for some bits in the data, in order to prevent the error flag circuit 111 from outputting an error signal. Put another way, for some data sets there may be discrepancies between the register entries and the memory entries, but these discrepancies are deliberate. Accordingly, exceptions logic 109 provides a bit mask to comparator logic 107 so that comparator logic 107 ignores these deliberate, or known, discrepancies and no error signal is triggered. Exceptions logic 109 may include the exceptions stored in a memory (e.g., ROM) in the exceptions logic 109.

Figure 1B:
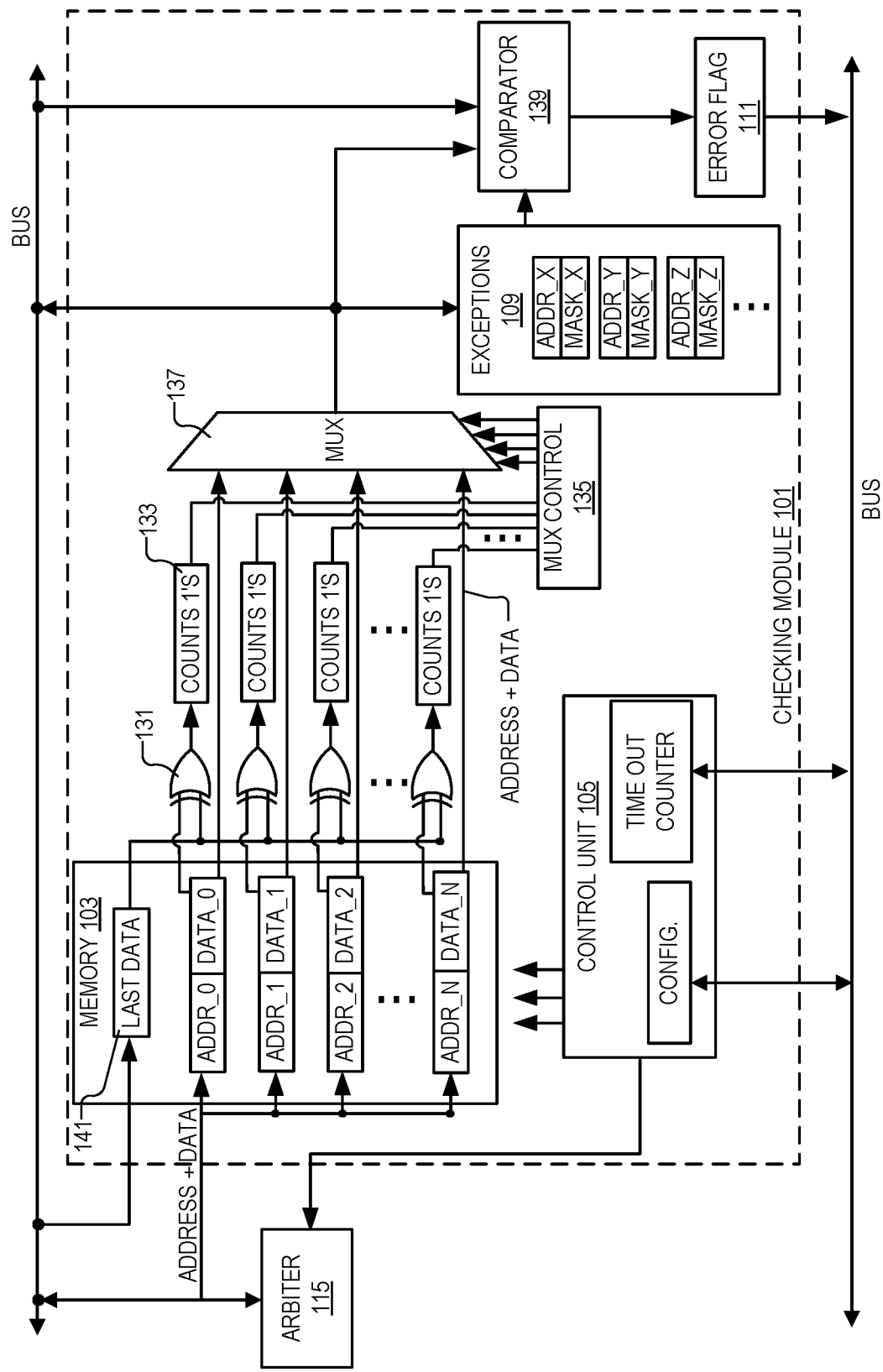
FIG. 1B illustrates an example circuit diagram of the checking module of FIG. 1A, in accordance with the teachings of the present invention.

FIG. 1B illustrates an example circuit diagram of checking module 101 of FIG. 1A, in accordance with the teachings of the present invention. One of ordinary skill in the art will appreciate that the elements of circuitry depicted are just one example of the components that could be used to build the system of FIG. 1A, and that the electronic components could be replaced with like components and placed in different locations in accordance with the teachings of the present discourse.

As shown, memory 103 includes data entries and corresponding addresses (e.g., entries "data_0; address_0" through "data_n; address_n"). Entries are coupled to XOR gates 131 (included in comparator logic 107 from FIG. 1A). XOR gates 131 are coupled to output the XOR result of input data and last data 141 from the registers. If the bits in the data sets are different from each other, the corresponding bits of the output of XOR gates 131 will be 1. The count 1 blocks 133 count the "1's" output from XOR gates and shows which data has the greatest number of different bits. Multiplexor control ("MUX control") 135 is coupled to the output of the count 1 blocks 133, and multiplexor ("MUX") 133 is coupled to multiplexor control 135. MUX control 135 may include an encoder to encode the output of the count 1 blocks 133 before they control MUX 133.

As described above, the output of MUX 137 (which may be included in comparator logic 107 from FIG. 1A) is compared (e.g., using comparator 139) to various exceptions, and a bit mask may be applied by exceptions logic 109. If there is no applicable exception, then the error flag circuit 111 may output an error signal.

Figure 2:
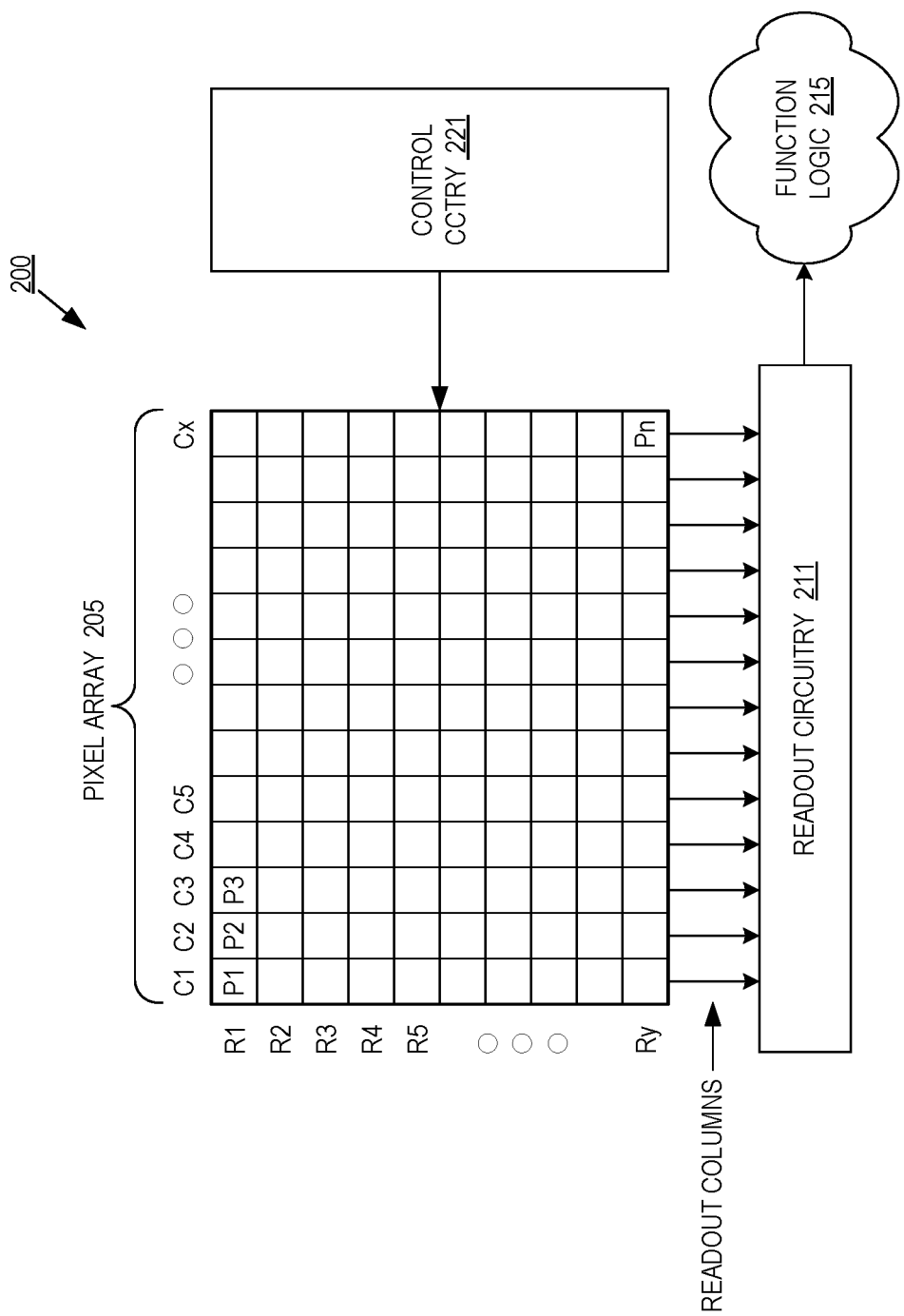
FIG. 2 is a block diagram illustrating one example of an imaging system that may supply data to the checking module in FIG. 1A, in accordance with the teachings of the present invention.

FIG. 2 is a block diagram illustrating one example of an imaging system that may supply data to the checking module in FIG. 1A (e.g., by being coupled to the arbiter via group hold), in accordance with the teachings of the present invention. Imaging system 200 includes pixel array 205, control circuitry 221, readout circuitry 211, and function logic 215. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 205 has acquired its image data or image charge, the image data is readout by readout circuitry 211 and then transferred to function logic 215. In various examples, readout circuitry 211 may include amplification circuitry, analog-to-digital (ADC) conversion circuitry, or otherwise. Function logic 215 may simply store the image data or even manipulate the image data by applying post image effects (e.g., crop, rotate, remove red eye, adjust brightness, adjust contrast, or otherwise). In one example, readout circuitry 211 may readout a row of image data at a time along readout column lines (illustrated) or may readout the image data using a variety of other techniques (not illustrated), such as a serial readout or a full parallel readout of all pixels simultaneously.

In one example, control circuitry 221 is coupled to pixel array 205 to control operation of the plurality of photodiodes in pixel array 205. For example, control circuitry 221 may generate a shutter signal for controlling image acquisition.

In one example, the shutter signal is a global shutter signal for simultaneously enabling all pixels within pixel array 205 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, imaging system 200 may be included in an automobile or the like. Additionally, imaging system 200 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to imaging system 200, extract image data from imaging system 200, or manipulate image data supplied by imaging system 200.

Figure 3:
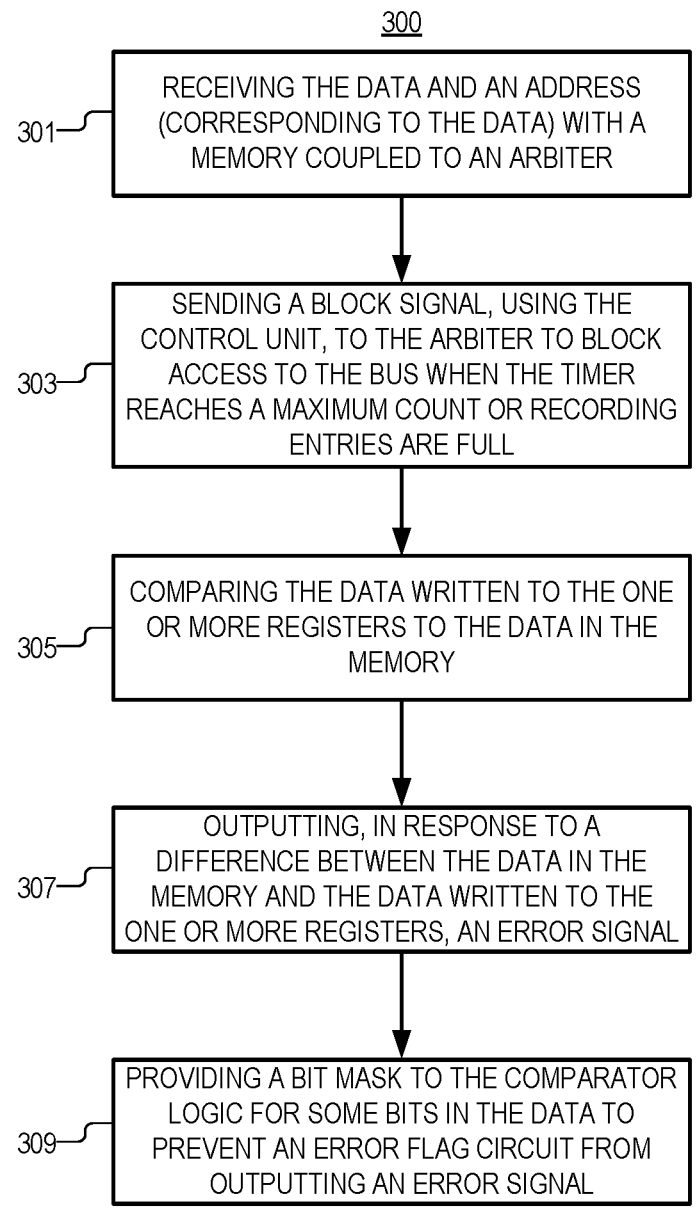
FIG. 3 illustrates an example method to verify data written to one or more registers, in accordance with the teachings of the present invention.

FIG. 3 illustrates an example method 300 to verify data written to one or more registers, in accordance with the teachings of the present invention. The order in which some or all process blocks appear in method 300 should not be deemed limiting. Rather, one of ordinary skill in the art having the benefit of the present disclosure will understand that some of method 300 may be executed in a variety of orders not illustrated, or even in parallel. Furthermore, method 300 may omit certain process blocks in order to avoid obscuring certain aspects. Alternatively, method 300 may include additional process blocks that may not be necessary in some embodiments/examples of the disclosure.

Block 301 illustrates receiving the data and an address, corresponding to the data, with a memory coupled to an arbiter. The data is also written to one or more registers (e.g., a circuit—which may include flip flops—with similar characteristics to memory such as an ability to read/write a plurality of bits at a time, and using an address to select particular registers) at the specified address.

Block 303 illustrates sending a block signal, using the control unit, to the arbiter to block access to the bus when a timer in the control unit reaches the maximum count or the recording entries are full. As described above, the data is received from the arbiter (e.g., a bus arbiter, or the like) with memory until a timer (e.g., a counter, or the like) in a control until reaches a maximum count, or until recording entries in the memory are full. After the timer reaches the maximum count (or the memory is full) and the block signal is sent, the data is no longer received by the memory and the one or more registers from the arbiter.

Block 305 shows comparing the data written to the one or more registers and the data in the memory using comparator logic. The comparator logic is coupled to the memory and to the one or more registers to compare the data in the memory and the registers once the counter reaches the maximum count (and data transfer to the memory and registries is temporarily paused). Ideally, the data in the memory should be the same as the data in the registers. However, there may be a mismatch (e.g., due to data corruption or the like). Thus, the comparator logic compares the (ideally) identical data sets to see if there are any discrepancies. This may include using one or more XOR gates to compare the data written to the one or more registers and the data in the memory. However, one of skill in the art will appreciate that comparison logic may be implemented using other logic gates and software.

In some examples, the address in the memory may be compared to the address in the one or more registers. Just like how the data in memory and the data in registers should be the same, the address in the memory should be the same as the address that the data was written to in the registers, and sometimes there may be a mismatch. Accordingly, the system may check that the addresses match.

Block 307 depicts outputting, in response to a difference between the data in the memory and the data written to the one or more registers, an error signal with an error flag circuit (e.g., a circuit that outputs a logic high or logic low signal in response to the comparator logic detecting a difference between the memory data and the register data) coupled to the comparator logic. The error signal may be output to a watchdog circuit which alerts other processes in the system to the presence of corrupt data.

Block 309 shows providing (e.g., with exceptions logic coupled to the comparator logic) a bit mask to the comparator logic for some bits in the data in order to prevent the error flag circuit from outputting an error signal. The exceptions logic may include a memory indicating when the bit mask should be applied (e.g., some registers may have auto reset bits, for which the mask should be applied).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A checking module coupled to one or more registers to verify data written to the one or more registers, the checking module comprising:
   a memory coupled to an arbiter to receive data, and an address corresponding to the data, from the arbiter, wherein the data is written to the one or more registers at the address;
   comparator logic coupled to the memory and to the one or more registers to compare the data written to the one or more registers and the data in the memory;
   an error flag circuit coupled to the comparator logic, wherein in response to a difference between the data in the memory and the data written to the one or more registers, the error flag circuit outputs an error signal; and
   a control unit coupled to the memory and the arbiter, wherein the memory accepts data from the arbiter until a timer in the control until reaches a maximum count or recording entries in the memory are full, and wherein in response to the timer reaching the maximum count or the recording entries being full, the comparator logic compares the data written to the one or more registers and the data in the memory,
   wherein the data is no longer received by the memory and the one or more registers from the arbiter when the timer reaches the maximum count,
   wherein the control unit sends a block signal to the arbiter to block access to the bus when the timer reaches the maximum count.

2. The checking module of claim 1, further comprising exceptions logic coupled to the comparator logic, wherein the exceptions logic provides a bit mask to the comparator logic for some bits in the data in order to prevent the error flag circuit from outputting an error signal.

3. The checking module of claim 2, wherein the exceptions logic includes bit mask memory including the bit mask.

4. The checking module of claim 1, wherein the memory, the comparator logic, and the arbiter are coupled to a bus, and wherein the bus is coupled to one or more registers.

5. The checking module of claim 1, wherein the comparator logic includes one or more XOR gates coupled to receive the data from the one or more registers and the memory.

6. The checking module of claim 1, wherein the comparator logic is coupled to the memory and to the one or more registers to compare the address in the memory and the address in the one or more registers.

7. The checking module of claim 6, wherein in response to a difference between the address in the memory and the address in the one or more registers, the error flag circuit outputs an error signal.

8. A method to verify data written to one or more registers, the method comprising:
  receiving the data, and an address corresponding to the data, with a memory coupled to an arbiter, wherein the data is written to the one or more registers at the address;
  comparing the data written to the one or more registers and the data in the memory using comparator logic coupled to the memory and to the one or more registers;
  outputting, in response to a difference between the data in the memory and the data written to the one or more registers, an error signal with an error flag circuit coupled to the comparator logic;
  receiving data from the arbiter with the comparator logic until a timer in a control until reaches a maximum count or recording entries in the memory are full, wherein the control unit is coupled to the memory and the arbiter;
  in response to the timer reaching the maximum count or the recording entries being full, comparing the data written to the one or more registers and the data in the memory, wherein the data is no longer received by the memory and the one or more registers from the arbiter when the timer reaches the maximum count; and
  sending a block signal, using the control unit, to the arbiter to block access to the bus when the timer reaches the maximum count.

9. The method of claim 8, further comprising providing, with exceptions logic coupled to the comparator logic, a bit mask to the comparator logic for some bits in the data in order to prevent the error flag circuit from outputting an error signal.

10. The method of claim 9, wherein the exceptions logic includes bit mask memory including the bit mask.

11. The method of claim 8, wherein the memory, the comparator logic, and the arbiter are coupled to a bus, and wherein the bus is coupled to one or more registers.

12. The method of claim 8, wherein comparing the data written to the one or more registers and the data in the memory includes using one or more XOR gates coupled to receive the data from the one or more registers and the memory.

13. The method of claim 8, further comprising comparing the address in the memory and the address in the one or more registers.

14. The method of claim 13, further comprising in response to a difference between the address in the memory and the address in the one or more registers, outputting an error signal with the error flag circuit.

* * * * *